United States Patent [19]
Cuingnet

[11] Patent Number: 5,772,476
[45] Date of Patent: Jun. 30, 1998

[54] ELECTRICAL CONTROL OR SIGNALLING DEVICE FITTED WITH A DETACHABLE UNIT

[75] Inventor: Patrick Cuingnet, Sochaux, France

[73] Assignee: Schneider Electric SA, Boulogne Billancourt, France

[21] Appl. No.: 776,608

[22] PCT Filed: Jun. 17, 1996

[86] PCT No.: PCT/FR96/00928

§ 371 Date: Feb. 20, 1997

§ 102(e) Date: Feb. 20, 1997

[87] PCT Pub. No.: WO97/01205

PCT Pub. Date: Jan. 9, 1997

[30] Foreign Application Priority Data

Jun. 20, 1995 [FR] France ................................. 95 07462

[51] Int. Cl.$^6$ ................................................ H01R 9/22
[52] U.S. Cl. ........................................ 439/717; 439/532
[58] Field of Search .......................... 439/532, 715–717, 439/181

[56] References Cited

U.S. PATENT DOCUMENTS

| 3,001,170 | 9/1961 | Eyre et al. ................................. 439/717 |
| 3,054,979 | 9/1962 | Buiting ................................. 439/717 X |
| 3,244,848 | 4/1966 | Chapin et al. ........................ 439/717 X |

FOREIGN PATENT DOCUMENTS 2446912  4/1976  Germany .

*Primary Examiner*—Khiem Nguyen
*Attorney, Agent, or Firm*—Oblon, Spivak, McClelland, Maier & Neustadt, P.C.

[57] ABSTRACT

An electrical controller signaling device such as a push-button which is fixed on a wall. The body of the push-button is inserted in an orifice in the wall and is mounted to the wall by means of a baseplate on the other side. A contact block is fixed to the baseplate using a rigid positioning and holding heel on one side and a screw on another side. The baseplate includes a complementary recess to receive the heel and a tapped hole to receive the fixing screw. The contact block may have similar tapped holes and recesses on its opposite end so that a second contact block may be mounted thereon.

7 Claims, 2 Drawing Sheets

ELECTRICAL CONTROL OR SIGNALLING DEVICE FITTED WITH A DETACHABLE UNIT

This invention relates to an electrical control or signalling device such as a push button comprising a body to be inserted into an orifice in a wall and an electrical unit, notably a contact block, and a supporting baseplate detachably joined to the body on the back of the wall and fitted with removable fixing means for the electrical unit.

Fixing the electrical unit in a detachable way to the supporting baseplate must be carried out in a reliable and durable manner. It is already known, for example, in accordance with document DE-24 46 912 to provide on the electrical unit, two elastic feet that click into lateral notches in the baseplate, but the fixing thus obtained is not sufficiently strong. On the other hand, it is known to fix the contact block to the baseplate by means of a single screw. The fixing is then strong and can be carried out rapidly enough but the prerequisite positioning of the unit is not satisfactory.

The object of the invention is to give great rigidity to the fixing of an electrical unit under a baseplate of a control or signalling device of the type described above, while reducing the time for mounting the device.

According to the invention, the electrical unit includes, on its fixing face situated towards the supporting baseplate, on one side a fixing screw that engages a tapped hole in the baseplate and on the opposite side a rigid positioning and holding heel engaged in a recess of a complementary shape, made in the baseplate.

The introduction of the rigid heel into the recess allows the operator to preposition the unit with the effect that one side of the unit is retained on the baseplate before the screw situated on the other side is tightened up.

The electrical units are advantageously stackable and have, for this reason, on their connecting face, which is situated on the other side to the baseplate, a tapped element and a recess similar to those on the baseplate in order to receive the fixing screw and respectively the rigid heel of a stacked unit.

The invention will be better understood by reading the description that will be made below, with reference to the Figures, of a preferred embodiment.

Figure 1:
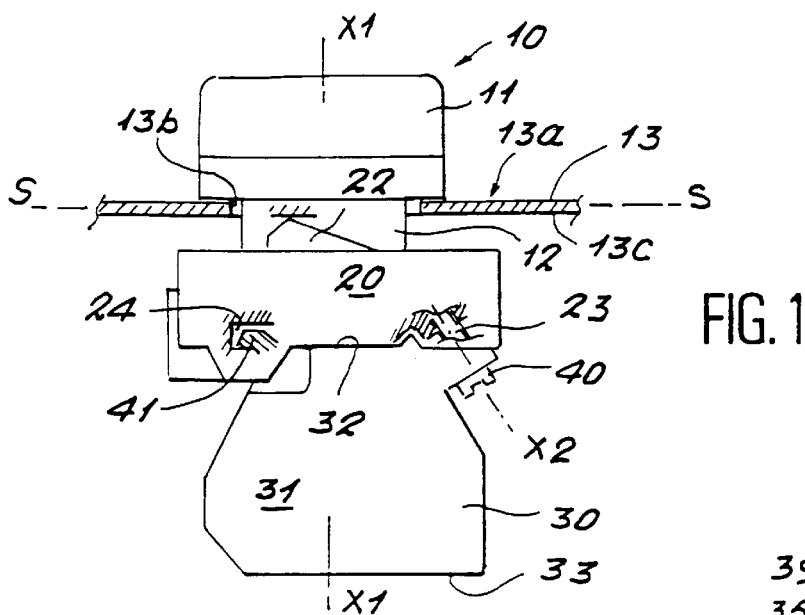
FIG. 1 is an elevation view of a push button conforming to the invention
Figure 3:
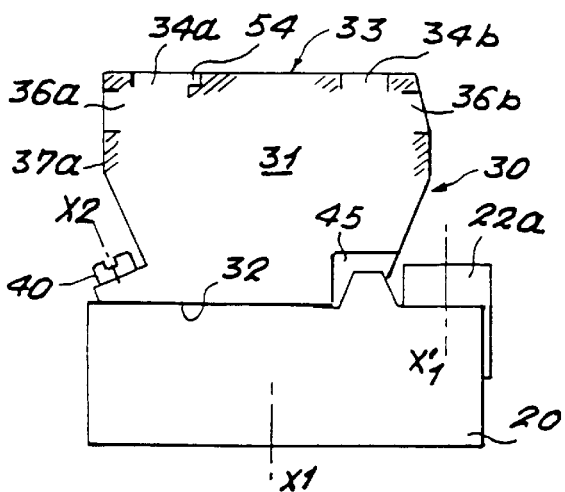
FIG. 3 is an elevation view of the part of the push button shown in FIG. 2.
Figure 2:
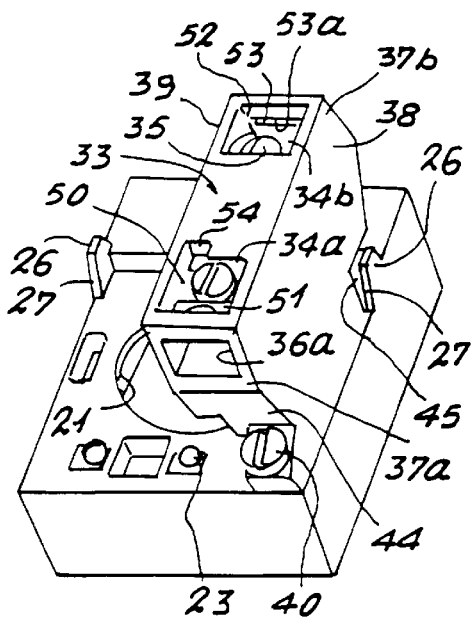
FIG. 2 shows, in perspective, a part of the push button, formed by the baseplate and the contact block.
Figure 4:
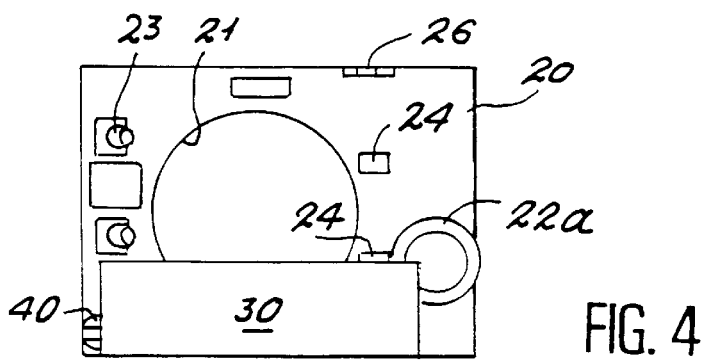
FIG. 4 is a plan view of the part shown in FIG. 3.

The electrical control or signalling device illustrated in the Figures is a push button comprising a body 10 fitted with a head 11 and a tubular part 12 with axis X1 and having a diameter less than the width of the head. This is positioned, with, if required, a seal and/or a label which are not shown, on the external face 13a of a thin support wall 13, for example made of metal, which forms part of an enclosure, such as a console, a cabinet, . . . . The wall 13 is oriented in a plane S and includes an orifice 13b into which the tubular part 12 of the push button is inserted, with clearance, this part including, for example, the moving shank of the push button.

A baseplate 20 of a generally polygonal shape, preferably rectangular, is linked to the push button on the reverse side of the wall 13, that is to say on the internal side of the wall 13, in order to support in a detachable way the detachable electrical units 30 such as switch contact blocks, indicator lamp units or auxiliary units. The baseplate is positioned on the tubular part 12 and is rigidly fixed to it by elements shaped to co-operate with one another, for example by fitting into one another, or by clicking onto one another, in order to prevent them being taken out in the direction X1. The baseplate 20 has a central opening 21 to allow free passage of the tubular part 12 of the push button and it is on the other hand fixed against the internal face 13c of the wall 13 by means of an attachment slide 22 acted on by a manipulation screw situated in a housing 22a with an axis X'1 parallel to X1.

The contact block 30 includes a prismatic casing 31 made of insulating material having on its baseplate side a fixing face and on the other side a connecting face 33 giving access to a tool via orifices 34a, 34b made in this face 33, with screws or other connecting elements 35 for the wiring conductors to be introduced laterally. The conductors can be introduced through orifices 36a, 36b made in the small side faces 37a, 37b of the casing; finally it has large side faces 38, 39.

The baseplate 20 is made of metal or plastic; it is capable of supporting several contact blocks side by side, three or more in number. In order to be fixed to the baseplate, each block 30 has, on its fixing face 32, on one side a fixing screw 40 with axis X2 inclined with respect to X1 and engaging with a hole 23 directly tapped in the baseplate if it is metal, or with a hole tapped in a metal insert if the baseplate is made of plastic; the block has, on its fixing face 32 and on the other side, a rigid heel 41 which is caught in a recess 24 of complementary shape made in the baseplate and is pressed against a shoulder 24a of this recess in such a way that the forces transmitted to the contact block by the push button along the pushing axis X1, are resisted.

The three tapped holes 23 are made on a small side of the baseplate and the three recesses 24 on the other small side of the baseplate. A moving finger 42 of the block 30 extends beyond the fixing face 32 to cooperate with the moving part of the push button; a pin or a rigid positioning rib 43 is provided on the fixing face 32 of the contact block, close to the screw 40, to engage with a hole or a locating slot 25 in the baseplate, and to thereby contribute, after the heel is located in the recess, to positioning the screw correctly.

The fixing screw 40 is accessible via a cutaway made in the small side face 37a of the casing 31. At the base of the large side faces 38, 39 of the contact block, a recess 45 is provided which is engaged with guiding and holding lugs 26 forming part of the baseplate; these lugs protrude downwards and have an inclined edge 27, the external face of which forms an extension to the large side walls of the baseplate. Satisfactory guidance of the side face of the contact block is thereby achieved when it is introduced askew and its rigid heel 41 is engaged in the recess 24 in the baseplate, so as to finally obtain alignment of a large side face 38 or 39 of an outside block with the corresponding large wall of the baseplate.

Figure 5:
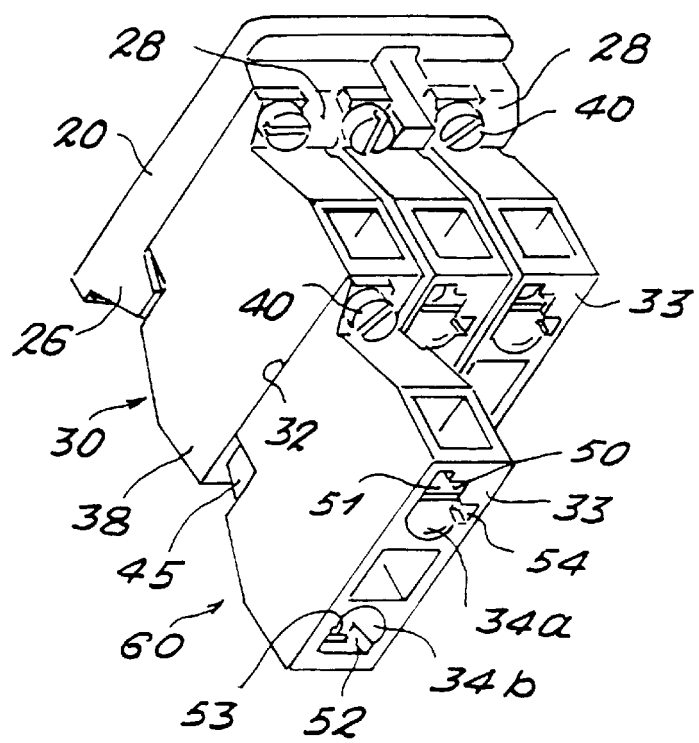
FIG. 5 is a perspective view of a stack of contact blocks under the baseplate of the push button.
Figure 6:
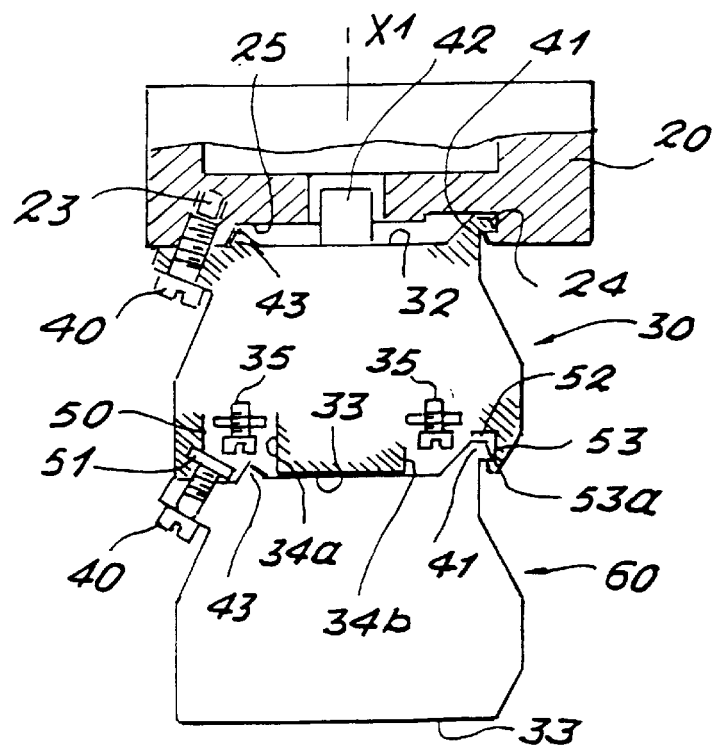
FIG. 6 is a side view of the stack.

On its connecting face 33, the block 30 has on one side, an orifice in which is housed an insert 51 such as a nut or a component with a tapped hole with an oblique axis parallel to X2 to receive the fixing screw 40 of a block 60 stacked on block 30. The nut 51 plays the same role as the tapped hole 23 in the baseplate 20. On the other side, the block 30 has an orifice 52 fitted with a recess 53 with a retaining shoulder 53a similar to the recess 24 in the baseplate 20 to receive the rigid heel 41 of the block 60. Although the orifices 50, 52 can be separate from the orifices 34a, 34b for the screws 35, they are preferably in common with these orifices as shown in FIGS. 5 and 6. The pin or the rib 43 situated on the fixing face 32 of the underlying block 60 engages with a hole or a slot 54 made in the connecting face 33 of the contact block 30. Housing shapes 28 can be provided under the baseplate 20 (see FIG. 5) between the tapped holes 23 to guide and to house the corresponding side of the fixing face 32 of blocks 30.

In this way several blocks 30 can be stacked taking advantage of the arrangement of having a screw and a rigid heel provided for the direct fixing of the blocks to the metal baseplate.

I claim:

1. An electrical device for mounting on a wall, comprising:
    a body including a push-button to be inserted into an orifice in said wall from a first side;
    a supporting baseplate detachably joined to said body on a second side of said wall so as to firmly attach said body and said baseplate to said wall;
    said baseplate being provided on a side away from said wall with a tapped hole and a recess; and
    a contact block mounted on said side of said baseplate away from said wall, said contact block having on a fixing surface adjacent to said baseplate a fixing screw which engages said tapped hole and a rigid positioning and holding heel having a complementary shape to said recess, wherein said heel is inserted into said recess and the contact block pivoted to bring said fixing screw into alignment with said tapped hole.

2. A device according to claim 1, further comprising a projection on said fixing face which engages with a locating recess in the baseplate to position the fixing screw in alignment with the tapped hole.

3. A device according to claim 1, wherein said recess includes a shoulder which supports the contact block in a direction of pushing of the device.

4. A device according to claim 1, wherein said contact block includes on a surface opposite said fixing surface a fixing orifice containing an insert with a second tapped hole similar to said tapped hole and a second recess similar to said recess to which a second contact block having a second fixing screw and a second rigid heel are mounted.

5. A device according to claim 4, wherein the fixing orifice is located in a housing orifice of an actuating element of a connecting terminal of the contact block.

6. A device according to claim 1, wherein a fixing screw of a connecting terminal of the contact block is positioned obliquely and is accessible by means of a cut-away in a side face of said contact block.

7. A device according to claim 1, wherein said contact block contains recesses on opposite side faces to engage a guiding and holding lug which projects from a side of said baseplate.

* * * * *